(12) United States Patent
Boldt et al.

(10) Patent No.: US 6,905,067 B2
(45) Date of Patent: Jun. 14, 2005

(54) GUIDE SHAFT FOR A CHIP CARD HOLDING ASSEMBLY

(75) Inventors: Matthias Boldt, Constance (DE); Klaus Hug, Oberndorf (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/831,146

(22) Filed: Apr. 26, 2004

(65) Prior Publication Data

US 2004/0195338 A1 Oct. 7, 2004

Related U.S. Application Data

(63) Continuation of application No. PCT/DE02/03819, filed on Oct. 10, 2002.

(30) Foreign Application Priority Data

Nov. 2, 2001 (DE) .......................................... 101 53 996

(51) Int. Cl.[7] .................................................. G06K 7/08
(52) U.S. Cl. ...................................................... 235/451
(58) Field of Search ................................ 235/451, 441, 235/453

(56) References Cited

U.S. PATENT DOCUMENTS 5,872,353 A * 2/1999 Reichardt et al. ........... 235/441

FOREIGN PATENT DOCUMENTS

| EP | 0742529 A2 | 11/1996 |
| FR | 2687238 A1 | 8/1993 |
| WO | WO 00/30016 | 5/2000 |

OTHER PUBLICATIONS

Derwent–Abstract; FR–2687238–A1; Aug. 13, 1993; Gemplus Card Int. SA, F–Leroux.

* cited by examiner

Primary Examiner—Thien M. Le
Assistant Examiner—Lisa M. Caputo
(74) Attorney, Agent, or Firm—Siemens AG; Jacob Eisenberg

(57) ABSTRACT

The proposed guide shaft which is formed on a card holder has a support, lateral guides and a holding part. The latter is formed and arranged on the card holder in such a way that a tongue which points toward the entrance of the guide shaft and rests in a sprung fashion on the support or on a chip card which has been introduced is implemented, and a gap which corresponds only to the thickness of the chip card is produced between the card holder and the support in the vicinity of the contact field.

13 Claims, 1 Drawing Sheet

GUIDE SHAFT FOR A CHIP CARD HOLDING ASSEMBLY

CROSS SECTION TO RELATED APPLICATIONS

The present application is a continuation of international application no.: PCT/DE02/03819, filed on: Oct. 10, 2002; which designated the United States, and further claims priority to priority application no.; 10153996.7, filed on: Feb. 11, 2001, the both of which are herein incorporated by reference.

BACKGROUND OF THE INVENTION

The invention relates to a guide shaft for a chip card holding assembly having a card holder on which a support which is assigned to the chip cards and lateral guides are formed, and having means for holding down in a sprung fashion a chip card on the support.

When chip cards are used in vehicles there is, depending on the environment, an increased risk of contact breaks due to soiling or chip cards moving due to unavoidable jolts. In addition, for example when chip cards are used in tacographs, the chip cards are introduced and removed relatively frequently owing to changes of driver and vehicle as well as traffic controls and the chip cards, which are used for driver-related storage of at least the personal working times and rest times, are not always handled with the necessary care, and as a result of this, but also due to the chip cards being carried and stored outside a vehicle, they may be damaged or deformed. However, such deformations of chip cards do not always lead to a situation in which, when a chip card is introduced into the holding assembly, the write/read contacts are damaged or the function of the chip card is disrupted when it is in the write/read position.

International patent application WO 00/30016, French laid-open patent application FR 2 687 238 and European patent application EP 0 742 529 A2 each disclose guide shafts for chip card holding devices of the abovementioned type which use elastic means for holding down the chip card which has been introduced. So that even greatly deformed chip cards experience the necessary correction of their shape in order to read out the entered card with elastic deformation, in these arrangements a high degree of spring force is always to be provided which has to be correspondingly overcome within the scope of each chip card-introducing operation. This results, on the one hand, in the need to use extremely strong spring elements, and on the other hand in a high degree of wear of the chip card in the regions in which the holding-down elastic elements slide over the surfaces. Given a weaker spring force of the holding down elements, reliable formation of contact is put at risk when the chip card is not correctly orientated.

SUMMARY OF THE INVENTION

The object of the present invention was accordingly to form the guide shaft of a chip card holding assembly, taking into account series compatibility which affects mounting and a comparatively low degree of expenditure on manufacturing the components in such a way that deformed chip cards can be introduced without an unacceptably high degree of wear and reliable contacting is ensured even in an extremely rough application environment.

The solution of the object which is set is characterized in that the holding down means form, in the region of the end of the guide shaft, a gap, for rigidly holding down, corresponding essentially to the thickness of a chip card, between themselves and the support, and provide a tongue which is spring-mounted on the card holder in such a way that the tongue points toward the entrance of the guide shaft and rests in a sprung fashion on a chip card which is located in the write/read position.

The solution of the object preferably provides for a single holding part which is capable of spring deflection to be provided, on which holding part on the one hand the tongue and on the other hand a structure which forms a gap with respect to the support are formed, and that the holding part is mounted on the card holder.

A preferred exemplary embodiment consists in the fact that the holding part is formed essentially as a leaf spring, and in that supporting limbs which can be combined with the card holder are formed onto the end of the holding part which faces away from the tongue, and in that, in addition, a yoke is assigned to the card holder transversely to the direction of movement of the chip cards, and in that the holding part is attached to the card holder in that it is supported—with prestress—on the one hand on the yoke and on the other hand, by means of the tongue and the supporting limbs, on the support or on lateral guides—bounding the latter laterally—of the card holder.

The advantage which the invention provides is in particular the fact that not only are deformed chip cards pulled down and leveled out at least in the write/read area, which is necessary for contact to be reliably formed, but in addition a chip card which is located in the guide shaft is held tight in a vibration-proof fashion. Furthermore, the holding part according to the invention, or the tongue formed thereon, serves as a dirt deflector and to a certain degree a seal. In addition, it provides a handling resistance when a chip card is introduced, which provides for the user—in particular if a chip card is introduced "without looking", reliable feedback information as to whether the chip card is in the guide shaft. It is thus worth mentioning that the guide shaft according to the invention can be implemented with a minimum of components and can be mounted relatively quickly and easily merely by means of joint connections. It is also advantageous that the overall height of the guide shaft is small despite the holding down function, and a chip card holding assembly which is equipped with the guide shaft according to the invention is provided which is independent with respect to this function, thus allowing it to be used in a general way.

BRIEF DESCRIPTION OF THE SEVERAL VIEWS OF THE DRAWINGS

The preferred exemplary embodiment of the invention will be explained in more detail below with reference to drawings, in which.

DETAILED DESCRIPTION OF THE INVENTION

Figure 1:
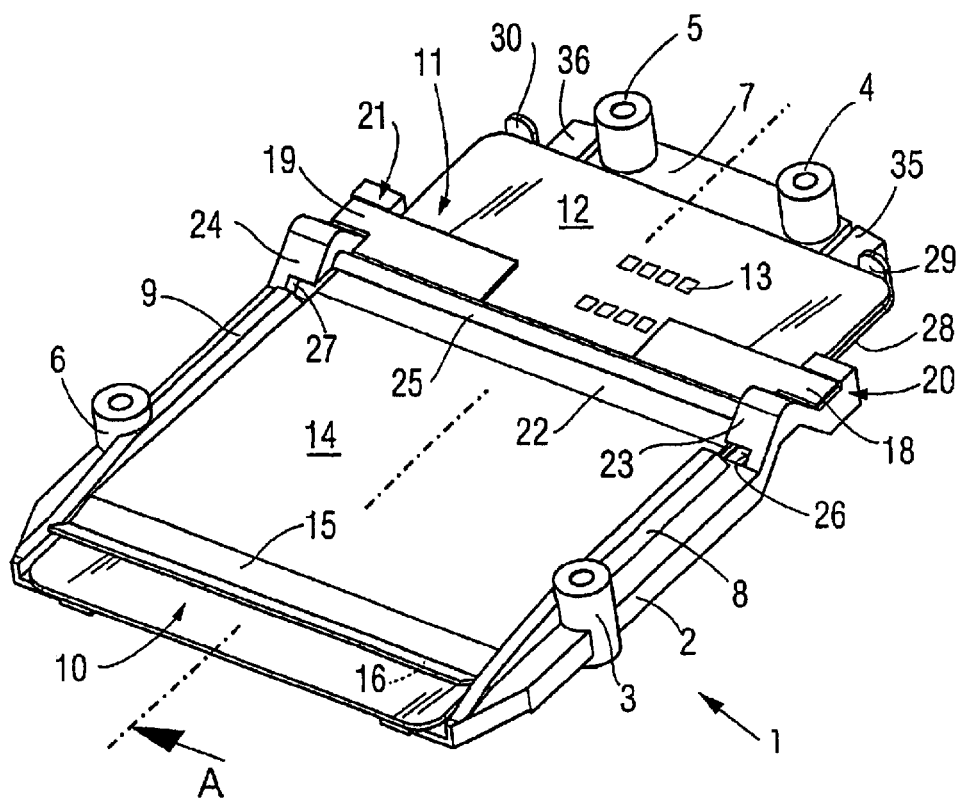
FIG. 1 shows a perspective plan view of a chip card holding assembly.

The chip card holding assembly 1 which is illustrated by FIG. 1 has a card holder 2 on which threaded bolts 3, 4, 5 and 6 are formed on in order to attach the chip card holding assembly 1, for example to a printed circuit board of a device. 7 designates a support, and 8 and 9 designate lateral guides—formed on the card holder 2—of the guide shaft 10.

A holding part which is designated by 11 and embodied as a two-armed lever which is capable of spring deflection and which is attached to the card holder 2 in a simple way which will be described below and serves as a holding down element completes the guide shaft 10.

Figure 2:
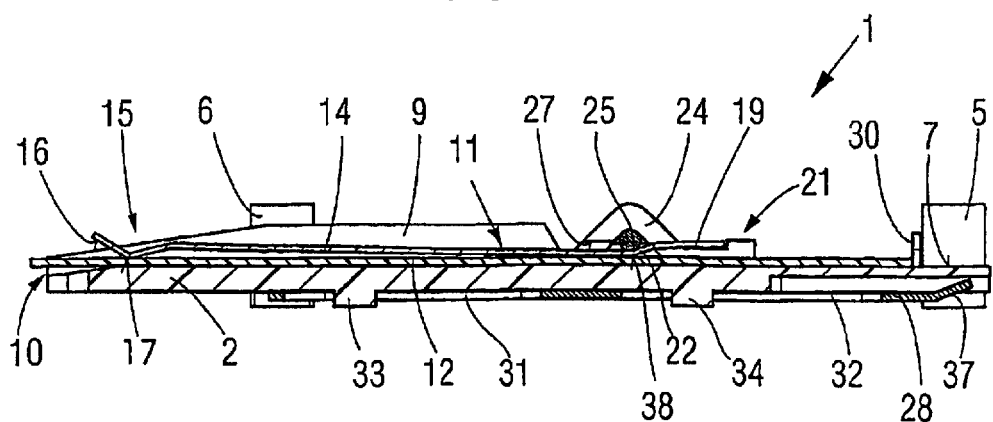
FIG. 2 shows a section along the sectional line A in FIG. 1.

FIGS. 1 and 2 show the chip card holding assembly 1 in a state in which a chip card 12 is in the write/read position. In this position, the chip card 12 rests (not illustrated) either on a stop which is formed on the card holder 2 or on a stop which is formed on the contact set which is assigned to the chip card contacts—one contact is designated by 13. The contact set is preferably mounted on the printed circuit board which has already been mentioned (not illustrated). However, it is also conceivable for the contact set to be attached to a bridge which is formed on the card holder 2, as a result of which the chip card holding assembly 1 would be embodied as a module which is capable of functioning independently of the introduction conditions.

As is also apparent from FIG. 1, in the write/read position of the chip card 12 a sprung tongue 14 which is formed on the holding part 11 which essentially constitutes a leaf spring, and corresponds to the width of the support, rests directly on the chip card 12. Here, the tongue 14 points toward the entrance of the guide shaft 10. A v-shaped profiled strip 15, which provides, on the one hand, a guiding surface 16, and on the other hand, a pulling off edge 17, is formed at the end side of the tongue 14. At the end of the holding part 11 which faces away from the tongue 14 supporting limbs 18 and 19 are formed, and mounts 20 and 21 which are formed from the lateral guides 8, 9 of the card holder 2 are assigned to said supporting limbs 18 and 19.

In comparison with the tongue 14, the supporting limbs 18, 19 are of bent construction specifically bent in the direction which is opposed to the pulling off edge 17. The stepped wall which is thus provided between the tongue 14 and the supporting limbs 18, 19 is designated by 22.

Bearing limbs which are formed on facing one another on each side of the support 7 on the card holder 2 and which serve to hold a rod 25 are designated by 23 and 24. In the selected exemplary embodiment, bearing shells which are not designated in more detail, and are accessible through slits 26 and 27 which are formed in the direction of the entrance of the guide shaft 10 into the bearing limbs 23, 24, are formed in the bearing limbs 23, 24. This solution makes for very simple mounting and a self-securing attachment of the holding part 11 in which the holding part 11 rests on the card holder 2 and the rod 25 is inserted laterally, i.e. in the direction of introduction of the chip cards, into the bearing limbs 23, 24 and snaps into the bearing shells under the effect of the sprung holding part 11. In other words, after the rod 25 has been mounted, the holding part 11 is supported, with prestress, on the card holder 2, on the one hand by means of the tongue 14 and on the other hand by means of the supporting limbs 18, 19. The mounts 20, 21 and the stepped wall 22 have the purpose of securing the holding part 11 against displacement when a chip card 12 is introduced and removed.

On the side of the card holder 2 which is opposite the guide shaft 10, a carriage which is designated by 28 is mounted in a displaceable fashion. Such a carriage engages in the movement path of the chip card 12 by means of two drivers 29 and 30. Two joint connections which can be mounted in the manner of a bayonet, i.e. keyhole-like openings 31 and 32 are provided in the carriage 28 and bearing pins 33 and 34 which are formed on the card holder 2 in a T shape, have the purpose of mounting the carriage 28.

35 and 36 designate bolts which are formed on the card holder 2 and which have the purpose of securing the carriage 28 in its plane of displacement. A projection which is designated by 37 and is formed in the center on the carriage 28 has the purpose, when the chip card 12 is removed, of permitting the carriage 28 to interact with a tappet which is activated by motor.

As is apparent in particular from FIG. 2, there is, owing to the bending of the supporting limbs 18, 19, a kink between the tongue 14 and the stepped wall 22 of the holding part 11 which acts as a directing edge 38 given appropriate dimensional correspondence between the bearing limbs 23, 24 and the bearing shells formed therein and of the rod 25, in other words only a gap which corresponds to the thickness of the chip card 12 is produced between the directing edge 38 and the support 7, and said gap provides, owing to the direct assignment of the rod 25 which serves as it were as a yoke, a means of holding down, in an absolutely rigid way, a chip card 12 which is not level.

For the sake of completeness it is also to be noted that the guide shaft according to the solution can also be implemented if, in the respective chip card holding device, means are provided for locking the introduction opening and/or means for automatically drawing in the chip card over a short distance, the latter means being able to provide, for example, a transporting roller which engages on the support 7 through an opening in the tongue 14. In addition it is conceivable for the holding part 11 to be constructed in such a way that the supporting limbs 18, 19 engage around the contact field 13 in a fork shape and either rest in a sprung fashion on a chip card which has been introduced, or, owing to the rigidity of the lever arm which is shorter in comparison with the tongue 14, are effective only in that they form a gap. The latter function is also necessary if, for example when the rod 25 is dispensed with, the holding part 11 is attached directly to stud bolts—formed onto the card holder 2—by screwing on or latching on.

We claim:

1. A guide shaft for a chip card holding assembly, comprising:
  a card holder fanned in the assembly, the card holder comprising a support assigned to the card and formed thereon, the support including side guides and spring holding means arranged to bear the card to the support, the spring holding means forming, proximate to an end of the guide shaft and card contacts, a gap essentially corresponding to a thickness of the chip card, the gap positioned between the spring holding means and the support; and
  a tongue spring-mounted on the card holder so as to point towards an entrance of the guide shaft and rest in a sprung fashion on the chip card when the chip card is located in a write/read position, the tongue engaging the card at a plurality of locations so as to form another gap between the locations and between the tongue and the card.

2. The guide shaft according to claim 1, further comprising:
  a single holding part arranged to deflect the spring holding means,
  the holding part accommodates the tongue thereon and comprises a structure forming a gap with respect to the support with the card holder mounted therein, and
  at least one of the plurality of locations is located proximate to the card contacts.

3. The guide shaft according to claim 2, wherein the holding part is a two-armed lever and mounted in a scalene fashion.

4. The guide shaft according to claim 2, wherein the holding part comprises a leaf spring, and the guide shaft further comprises supporting limbs arranged to be combined with the card holder arid formed onto an end of the holding part facing away from the tongue.

5. The guide shaft according to claim 2, further comprising a yoke assigned to the card holder and arranged transversely to a direction of movement of the chip card, and wherein the holding part is attached to the card holder such that it is supported with prestress on the yoke and by means of the tongue and the supporting limbs on the support or on lateral guides bounding the support of the card holder.

6. The guide shaft according to claim 5, wherein the supporting limbs form a gap for guiding the chip card therein, the gap being formed by means of sliding shoes, and the supporting limbs are located on either side of the contact field of the chip card when the chip card is located in the write/read position.

7. The guide shaft according to claim 5, further comprising:
   bearing limbs arranged facing one another and formed on the card holder on each side of the support, and
   a rod arranged to function as a yoke, the rod being assigned to the bearing limbs.

8. The guide shaft according to claim 7, further comprising accessible bearing shells facilitating a snap-in attachment of the rod via interaction with the holding part-, the shells being formed in the bearing limbs.

9. The guide shaft according to claim 8, wherein the shells are formed in the bearing limbs in a direction of movement of the chip cards.

10. The guide shaft according to claim 2, further comprising stud bolts formed on the card holder, and wherein the holding part further comprises openings assigned to the stud bolts such that the holding part may be attached directly to the card holder by plugging onto the stud bolts.

11. The guide shaft according to claim 1, wherein a width of the tongue corresponds to a width of the support-, and a guide face is formed on the end face of the tongue.

12. The guide shaft according to claim 1, wherein the plurality of locations comprise two locations.

13. The guide shaft according to claim 12, wherein one of said two locations is positioned proximate to the card contacts and a second of the two locations is positioned proximate to the entrance.

* * * * *